(12) United States Patent
Kudose et al.

(10) Patent No.: US 8,368,270 B2
(45) Date of Patent: Feb. 5, 2013

(54) STATOR OF ELECTRIC ROTATING MACHINE

(75) Inventors: Yuichi Kudose, Kariya (JP); Hiroaki Ishikawa, Nagoya (JP); Atsuo Ishizuka, Nagoya (JP); Tatsuhiko Mizutani, Toyota (JP); Kazuhiro Goto, Toyota (JP)

(73) Assignees: Denso Corporation, Kariya (JP); Toyota Jidosha Kabushiki Kaisha, Toyota-shi (JP)

( * ) Notice: Subject to any disclaimer, the term of this patent is extended or adjusted under 35 U.S.C. 154(b) by 313 days.

(21) Appl. No.: 12/750,249

(22) Filed: Mar. 30, 2010

(65) Prior Publication Data

US 2011/0080064 A1    Apr. 7, 2011

(30) Foreign Application Priority Data

Mar. 31, 2009  (JP) ................................ 2009-086211
Feb. 26, 2010  (JP) ................................ 2010-042640

(51) Int. Cl.
*H02K 5/04*    (2006.01)
(52) U.S. Cl. .................... 310/89; 310/216.008
(58) Field of Classification Search .............. 310/89, 310/91, 401–433, 216.008–216.009, 50, 310/52–54, 58–59
See application file for complete search history.

(56) References Cited

U.S. PATENT DOCUMENTS

| | | | | |
|---|---|---|---|---|
| 2,412,254 A | * | 12/1946 | Edelman | 310/75 R |
| 6,864,605 B2 | * | 3/2005 | Shimizu et al. | 310/68 R |
| 6,975,057 B2 | * | 12/2005 | Gauthier et al. | 310/216.095 |
| 2004/0007934 A1 | * | 1/2004 | Michaels et al. | 310/254 |
| 2006/0087183 A1 | * | 4/2006 | Tanaka et al. | 310/89 |
| 2007/0080592 A1 | * | 4/2007 | Ohta et al. | 310/71 |
| 2007/0210655 A1 | * | 9/2007 | Bahr et al. | 310/54 |

FOREIGN PATENT DOCUMENTS

| | | | | |
|---|---|---|---|---|
| JP | 07163070 | A | * | 6/1995 |
| JP | 11308820 | A | * | 11/1999 |
| JP | 2002-51485 | | | 2/2002 |
| JP | 2007-189784 | | | 7/2007 |
| JP | 2007-189785 | | | 7/2007 |
| JP | 2008193806 | A | * | 8/2008 |
| JP | 2009-060760 | | | 3/2009 |

OTHER PUBLICATIONS

Nagatake et al, JP07163070A Machine Translation, Jun. 1995.*
Japanese Office Action dated Oct. 18, 2011, issue in corresponding Japanese Application No. 2010-042640 with English Translation.

* cited by examiner

*Primary Examiner* — Quyen Leung
*Assistant Examiner* — Eric Johnson
(74) *Attorney, Agent, or Firm* — Nixon & Vanderhye PC

(57) ABSTRACT

The stator of an electric rotating machine includes a stator core constituted of a plurality of split cores joined to one another in a ring, a plurality of phase windings wound around the stator core, and an outer casing to an inner periphery of which an outer periphery of the stator core is fitted with clamping margin therebetween. The outer casing is provided with a brim including at least two brim portions at least at one of axial ends thereof. The brim portions are spaced from each other in a circumferential direction of the outer casing and project in a direction receding from a center axis of the outer casing.

4 Claims, 13 Drawing Sheets

STATOR OF ELECTRIC ROTATING MACHINE

CROSS-REFERENCE TO RELATED APPLICATION

This application is related to Japanese Patent Applications No. 2009-86211 filed on Mar. 31, 2009, and No. 2010-42640 filed on Feb. 26, 2010, the contents of which are hereby incorporated by reference.

BACKGROUND OF THE INVENTION

1. Field of the Invention

The present invention relates to a stator of an electric rotating machine, the stator including a stator core constituted of a plurality of split cores fitted to an outer casing by shrink-fitting, for example.

2. Description of Related Art

In recent years, there is a growing need for a compact and high-output electric rotating machine usable as an electric motor or an alternator. One of the reasons is that the space for accommodating an electric rotating machine mounted on a vehicle is becoming smaller and smaller, while the output required of the electric rotating machine is becoming higher and higher.

It is known to dispose a plurality of split cores in a ring assembly, and fit the ring assembly of the split cores to a cylindrical casing (outer casing) at its outer circumference to form a stator core. For example, refer to Japanese Patent Application Laid-open No. 2002-51485.

This patent document discloses using a shrink-fitting method to fit the ring assembly of the split cores to the outer casing. In this method, the outer casing whose inner diameter is slightly smaller than the outer diameter of the ring assembly of the split cores is set in place, and the ring assembly is fitted into the outer casing which is being heated so that its inner diameter expands. After completion of the shrink-fitting, the ring assembly of the split cores and the outer casing are fixed firmly to each other by the stress due to difference between their diameters.

Meanwhile, the thickness of the outer casing is required to be as thin as possible in order to provide a compact and high output electric rotating machine. However, reducing the thickness of the outer casing causes a problem that the roundness of the above ring assembly of the split cores is lowered because of reduction of rigidity of the outer casing.

SUMMARY OF THE INVENTION

The present invention provides a stator of an electric rotating machine comprising:

a stator core constituted of a plurality of split cores joined to one another in a ring;

a plurality of phase windings wound around the stator core; and an outer casing to an inner periphery of which an outer periphery of the stator core is fitted with clamping margin therebetween;

wherein the outer casing is provided with a brim including at least two brim portions at least at one of axial ends thereof, the brim portions being spaced from each other in a circumferential direction of the outer casing and projecting in a direction receding from a center axis of the outer casing.

The present invention also provides a stator of an electric rotating machine comprising:

a stator core constituted of a plurality of split cores joined to one another in a ring;

a plurality of phase windings wound around the stator core; and an outer casing to an inner periphery of which an outer periphery of the stator core is fitted with clamping margin therebetween;

wherein the outer casing is provided with a first brim at one of axial ends thereof, and a second brim at the other of the axial ends thereof, the first brim including at least two brim portions being spaced from each other in a circumferential direction of the outer casing and projecting in a direction receding from a center axis of the outer casing, the second brim projecting in a direction approaching the center axis of the outer casing.

According to the present invention, there is provided a compact and high-output electric rotating machine including a stator having a high degree of roundness.

Other advantages and features of the invention will become apparent from the following description including the drawings and claims.

PREFERRED EMBODIMENTS OF THE INVENTION

First Embodiment

First, the structure of an electric rotating machine 1 including a stator of the invention is explained.

Figure 1:
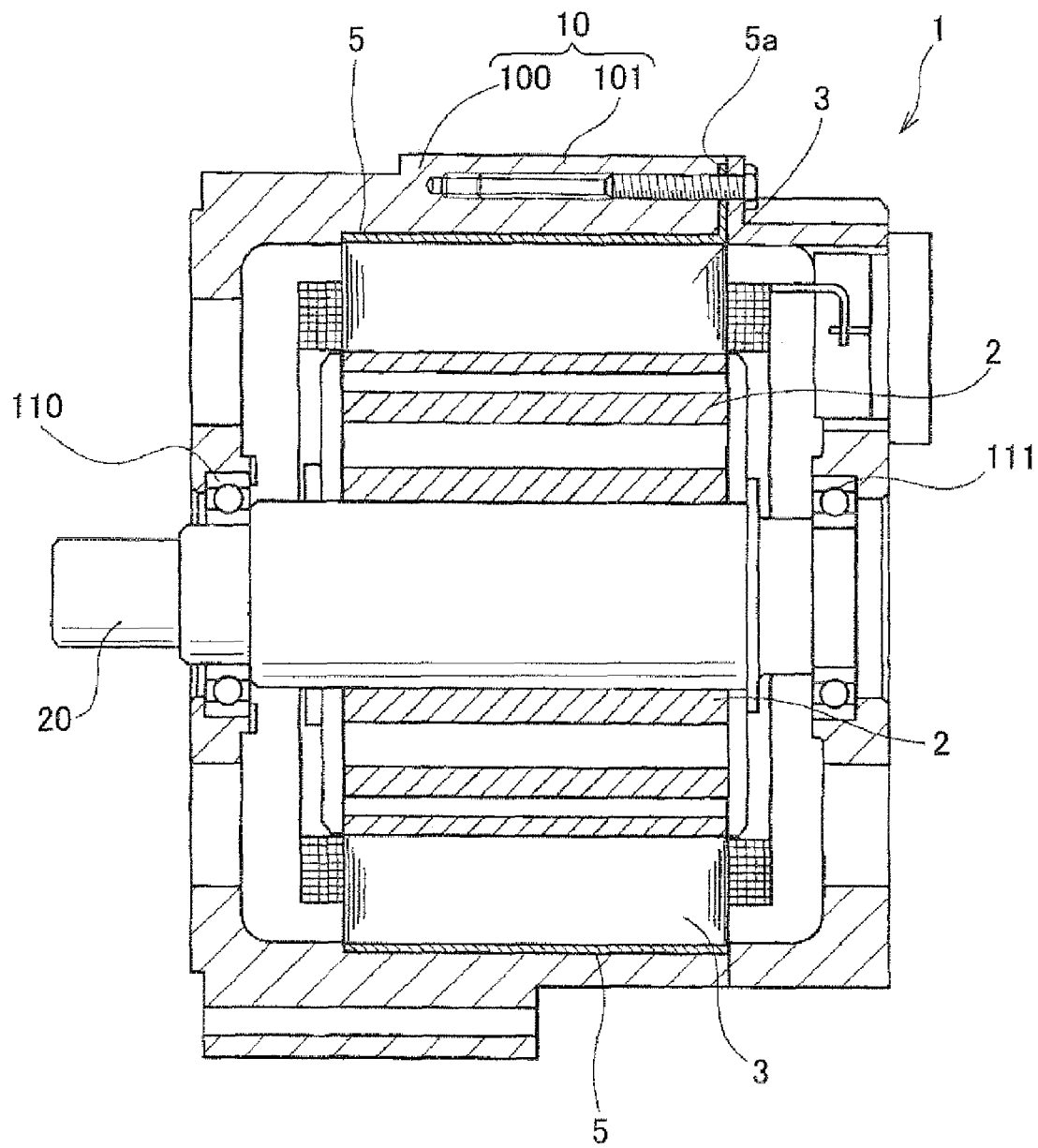
FIG. 1 is an axial cross sectional view schematically showing the structure of an electric rotating machine including a stator according to a first embodiment of the invention.

As shown in FIG. 1, the electric rotating machine 1 includes a housing 10 constituted of a pair of housing members 100 and 101 each having a bottomed cylindrical shape and joined to each other at their opening portions, a rotor 2 fixed to a rotating shaft 20 rotatably supported by the housing 10 through bearings 110 and 111, and a stator 3 fixed to the housing 10 so as to surround the rotor 2 inside the housing 10.

The rotor 2 is provided with a plurality of magnet poles (S poles and N poles) formed in the outer periphery of the rotor 2 facing the inner periphery of the stator 3, such that different polarities alternate in the circumferential direction of the rotor 2. In this embodiment, an 8-pole (four N poles and four S poles) rotor is used as the rotor 2.

Figure 2:
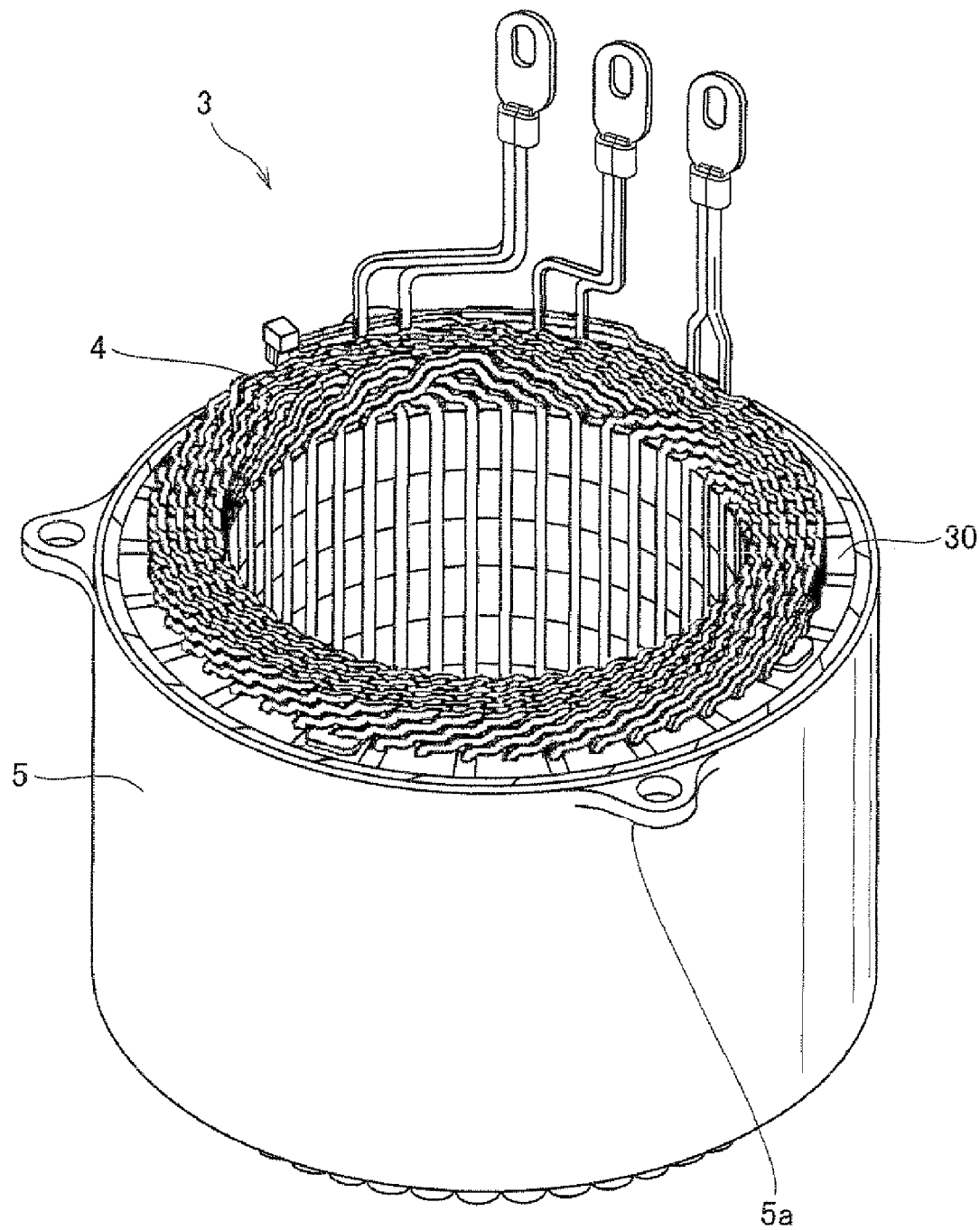
FIG. 2 is a perspective view of the stator of the first embodiment.

As shown in FIG. 2, the stator 3 includes a stator core 30, a three-phase stator coil 4 constituted of a plurality of phase windings, and an outer casing 5 fitted to the stator core 30.

Figure 3:
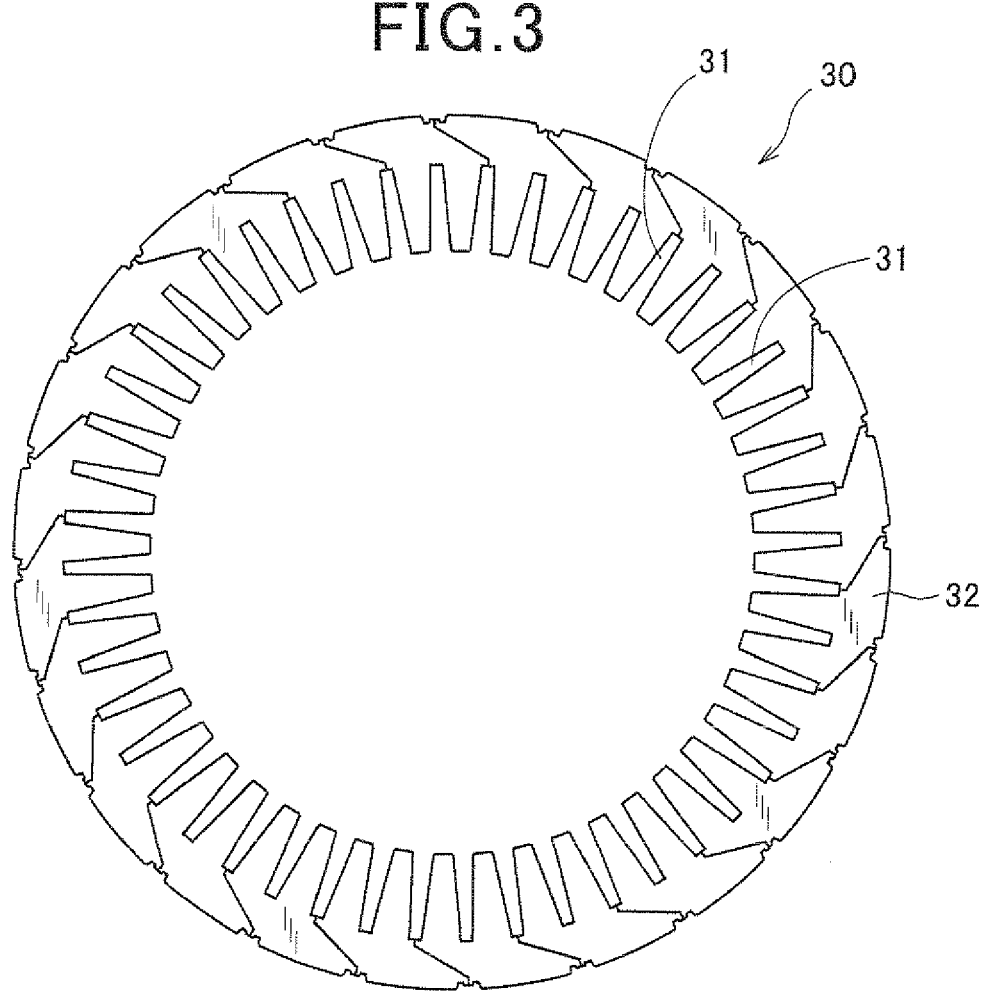
FIG. 3 is a plan view of a stator core of the stator of the first embodiment.

As shown in FIG. 3, the stator core 30 has a shape of a circular ring formed with slots 31 at its inner periphery. The depth direction of the respective slots 31 coincide with the radial direction of the stator core 30. The stator core 30 is formed with two slots 31 for each pole of the stator 2 for each one of the phases of the stator coil 4. In this embodiment, the total number of the slots 31 is 48 (=8×3×2).

Figure 4:
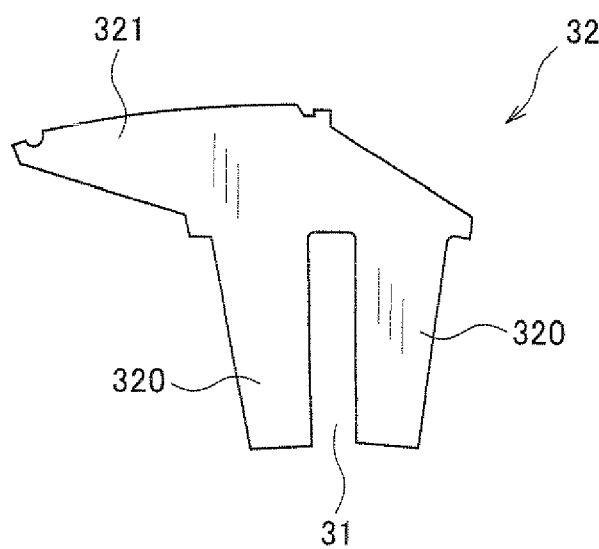
FIG. 4 is a plan view of one of split cores constituting the stator core of the stator of the first embodiment.

The stator core 30 is constituted of a predetermined number of (twenty four in this embodiment) split cores 32 circumferentially joined to one another. As shown in FIG. 4, the split core 32 has a shape to define one slot 31 itself, and define another slot 31 with a circumferentially adjacent split core 32. The split core 32 is constituted including a pair of tooth portions 320 extending radially inwardly, and a back core portion 321 connecting these tooth portions 320 at a radially outward position.

The split cores 32 are formed by laminating electromagnetic steel plates. Between each adjacent two of the laminated electromagnetic steel plates, an insulating thin film is interposed. The split cores 32 may be formed by laminating metal thin plates other than electromagnetic steel plates, while interposing an insulating thin film between each adjacent two of the metal thin plates.

The shape of the stator core 30 is not limited to the one shown in FIGS. 3 and 4. For example, the stator core 30 may have a shape shown in FIGS. 5 and 6.

Figure 5:
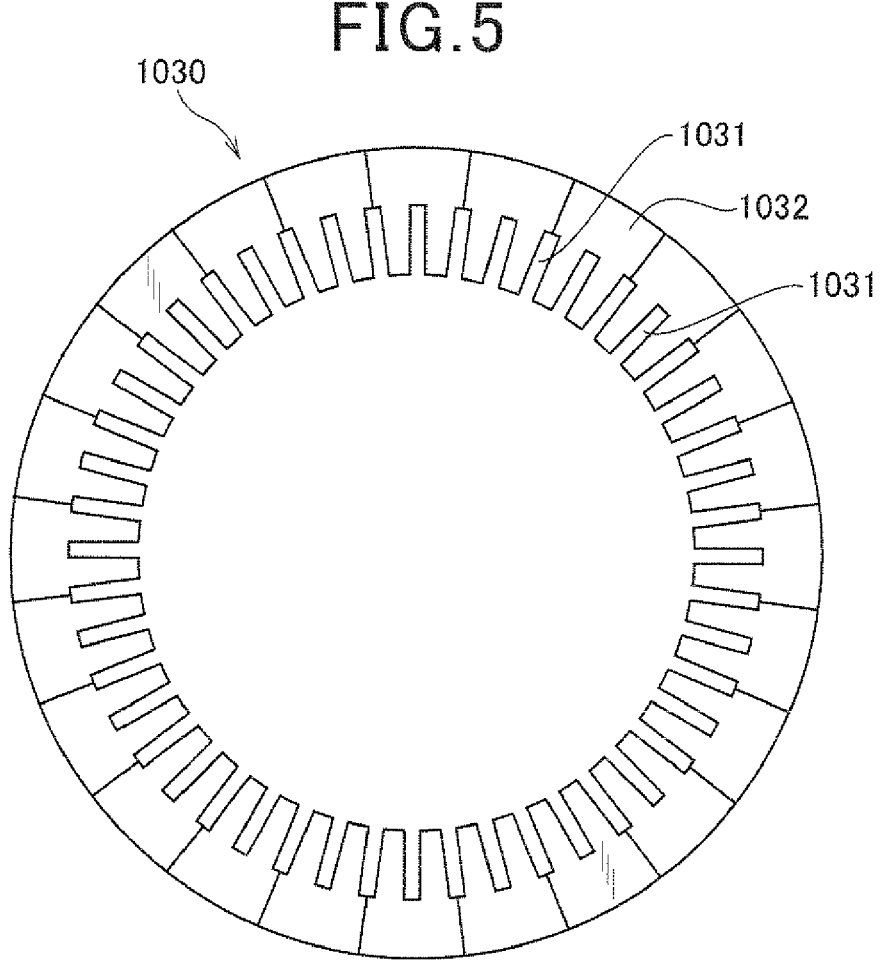
FIG. 5 is a plan view of a modification the stator core of the stator of the first embodiment.
Figure 6:
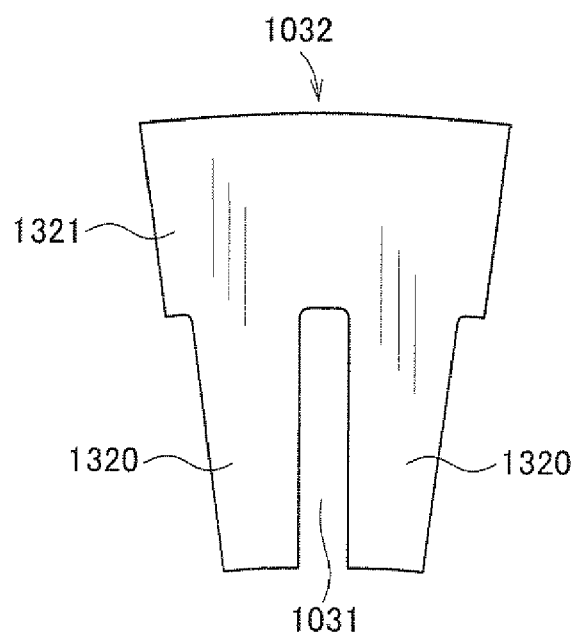
FIG. 6 is a plan view of a modification of the split core of the stator of the first embodiment.

The stator core 1030 having the circular ring shape shown in FIGS. 5 and 6 is constituted of split cores 1032 circumferentially joined to one another. The split core 1032 is constituted including a pair of tooth portions 1320 extending radially inwardly, and a back core portion 1321 connecting these tooth portions 1320 at a radially outward position. Each split core 1032 defines one slot 1031 itself, and another slot 1031 with a circumferentially adjacent split core 1032. That is, one slot 1031 is defined by a pair of the radially inwardly extending tooth portions 1320 of one split core 1032, or by one of the tooth portions 1320 of one split core 1032 and one of the tooth portions 1320 of another split core 1032. In this example, the split core 1032 has such a shape that the back core portion 1321 thereof does not radially overlap with circumferentially adjacent split cores 1032. The number and material of the split cores 1032 are the same as those of the split cores 32 shown in FIG. 4.

Figure 7A:
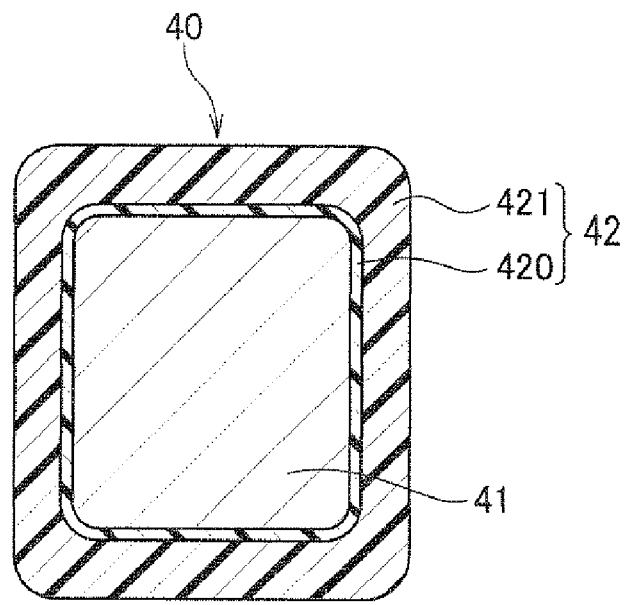
FIG. 7A is a cross sectional view of a winding of a stator coil of the stator of the first embodiment.

The stator coil 4 is constituted of a plurality of windings 40 wound together in a given way. As shown in FIG. 7A, each of the windings 40 includes a copper conductor 41, and an insulating film 42 constituted of an inner layer 420 and an outer layer 421 covering the outer surface of the conductor 41 for insulation.

Since the insulating film 42 is sufficiently thick, it is not necessary to interpose insulating paper or the like between each adjacent two of the windings 40 for insulation therebetween. However, insulating paper or the like may be interposed between each adjacent two of the windings 40 or between the stator core 30 and the stator coil 4.

Figure 7B:
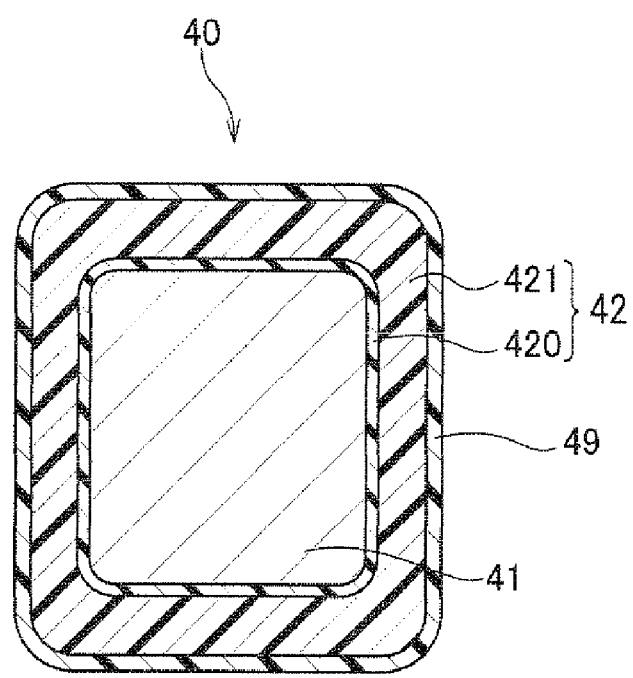
FIG. 7B is a cross sectional view of a modification of the winding of a stator coil of the stator of the first embodiment.

As shown in FIG. 7B, the outer surface of the insulating film 42 may be coated with a fusion member 49 made of fusion material such as epoxy resin. The fusion member 49 melts more earlier than the insulating film 42 when the electric rotating machine I generates heat, and accordingly, the windings 40 accommodated in the same slot 31 heat-adhere to each other through their fusion members 49. As a result, since the windings 40 accommodated in the same slot 31 become integrated and rigid, the mechanical strength of the windings 40 increases.

Figure 8:
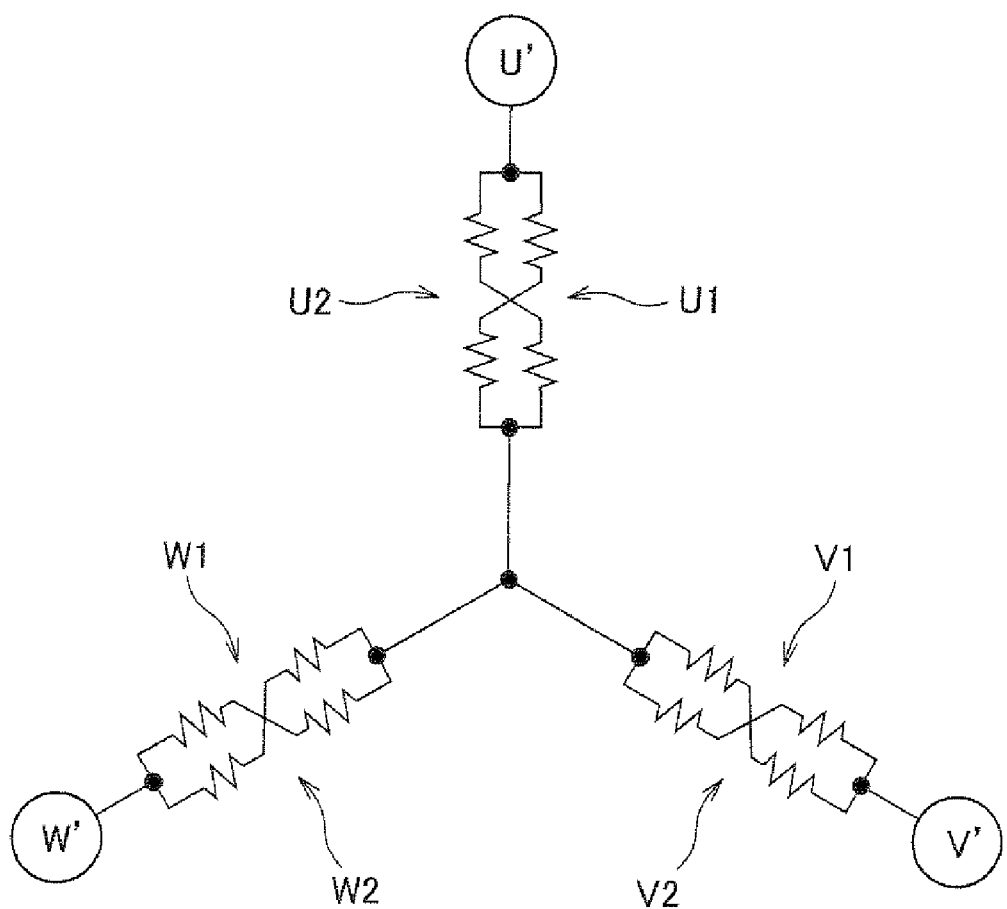
FIG. 8 is a diagram showing wiring of the stator coil of the stator of the first embodiment.

In this embodiment, as shown in FIG. 8, the stator coil 4 is constituted of two sets of three-phase windings (windings U1, U2, V1, V2, W1 and W2).

Figure 9:
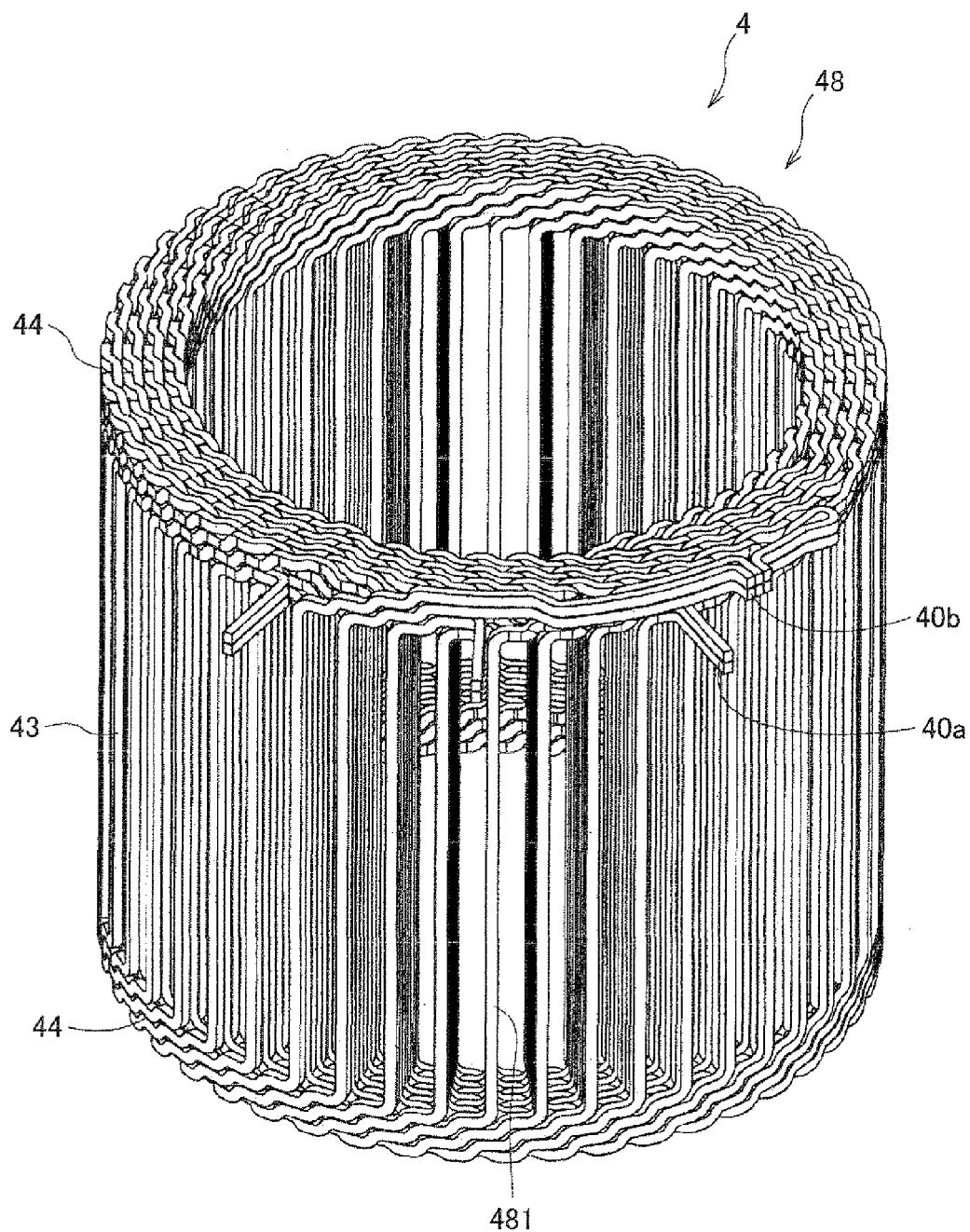
FIG. 9 is a perspective view of a roll body to make the stator coil of the stator of the first embodiment.

As shown in FIG. 9, the stator coil 4 is a roll body 48 formed by rolling an assembled wire body 47 (see FIG. 10) formed by assembling the windings 40 in a predetermined shape. Each of the windings 40 constituting the stator coil 4 is wave-wound along the circumferential direction on the side of the inner periphery of the stator core 30.

Each of the windings 40 includes in-slot portions 43 of a linear shape accommodated in the slots 31, and turn portions 44 each connecting the adjacent in-slot portions 44 to each other. The in-slot portions 44 of the same winding 40 are accommodated in every predetermined number of the slots 31 (every six slots 31 in this embodiment). The turn portions 44 project from the axial ends of the stator core 30.

Each of the windings 40 is wave-wound along the circumferential direction with both ends thereof being projected from the axial ends of the stator core 30. Each one of the respective phases of the stator coil 4 is formed from two of the windings 40 (referred to as a "first winding 40a" and a "second winding 40b" hereinafter) which are connected to each other at their one ends. That is, one phase of the stator coil 4 is constituted of a wire assembly formed by connecting one ends of two shaped bodies formed from two electric wires to each other.

The in-slot portions 43 of the first winding 40a and the in-slot portions 43 of the second winding 40b are accommodated in the same slots 31 such that they alternate in the depth direction in the slots along the circumferential direction. The portion at which the first and second windings 40a and 40b are connected to each other (referred to as a connecting portion 45 hereinafter) is formed at a turn-round portion 46 constituted by a specific one of the in-slot portions 44 at which the winding direction is reversed.

Figure 10:
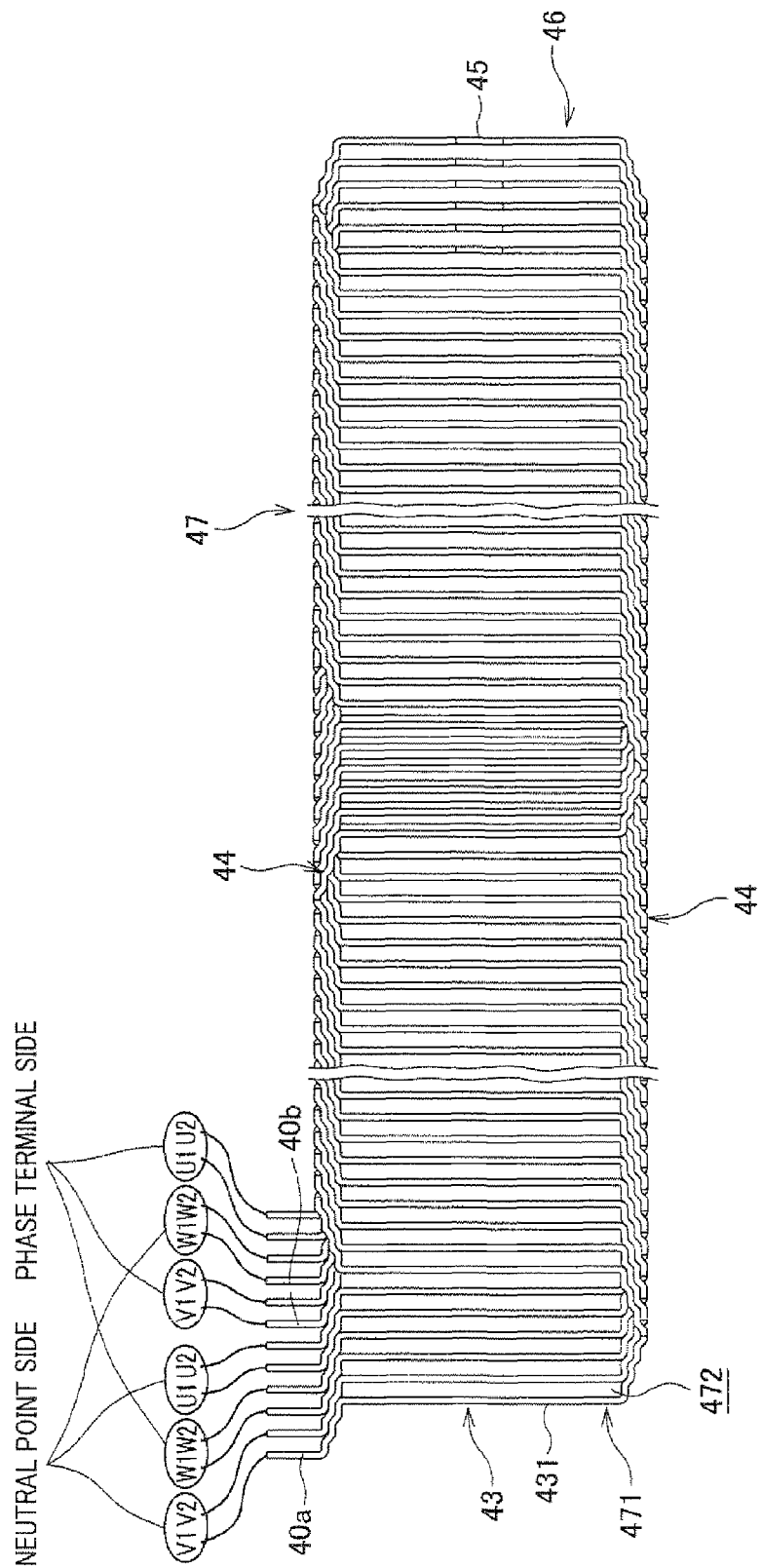
FIG. 10 is an exploded view of the stator coil of the stator of the first embodiment.

FIG. 10 is an exploded view of the stator coil 4, or a plan view of the assembled wire body 47 before being rolled. The stator coil 4 is constituted of six wire assemblies each including the first and second windings 40a and 40b having different winding directions. The six wire assemblies constitute 2 sets of three phase windings (U1, V1, W1 and U2, V2 and W2). In each wire assembly, one end of the first winding 40a on the side opposite to the neutral point side (or on the side of the phase terminal) is connected to one end of the second winding 40b on the side of the phase terminal (or on the side opposite to the neutral point) at the in-slot portion forming the turn-round portion 46.

Figure 11:
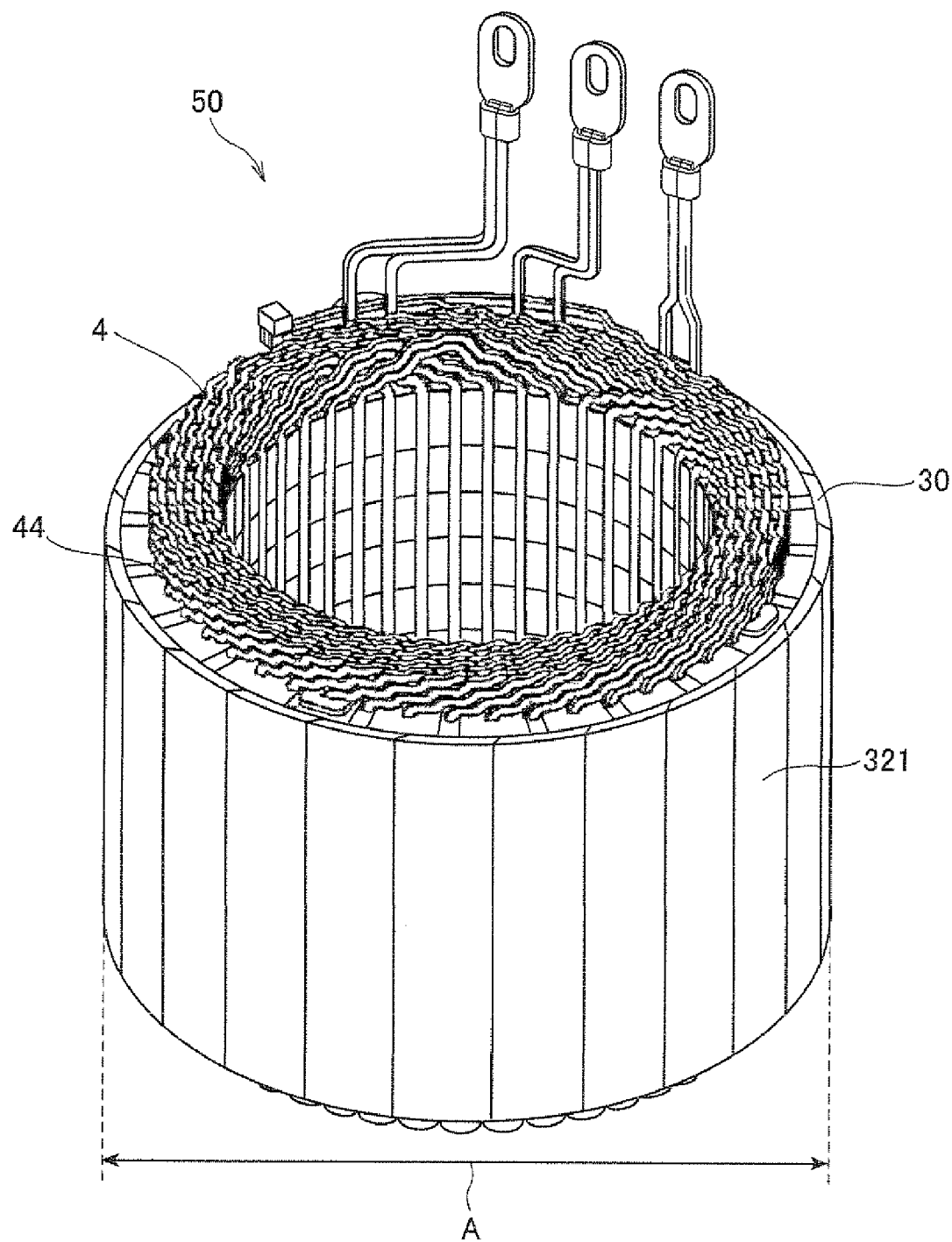
FIG. 11 is a perspective view of an assembly body of the stator of the first embodiment.
Figure 12:
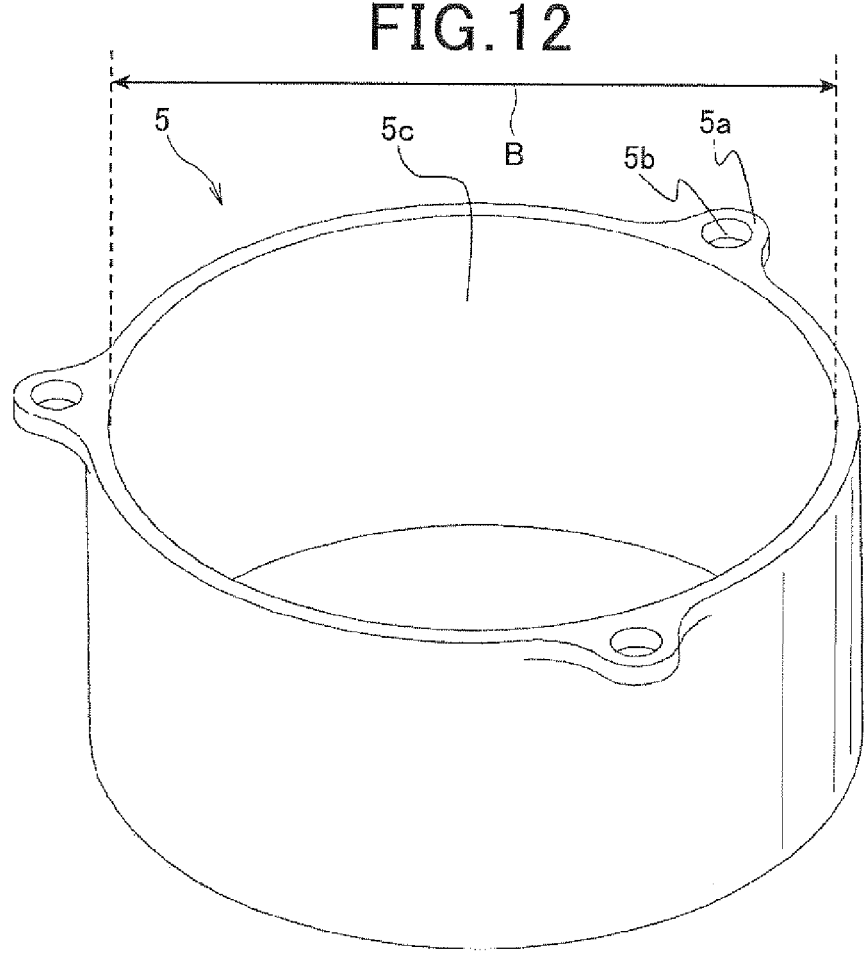
FIG. 12 is a perspective view of an outer casing of the stator of the first embodiment.
Figure 13:
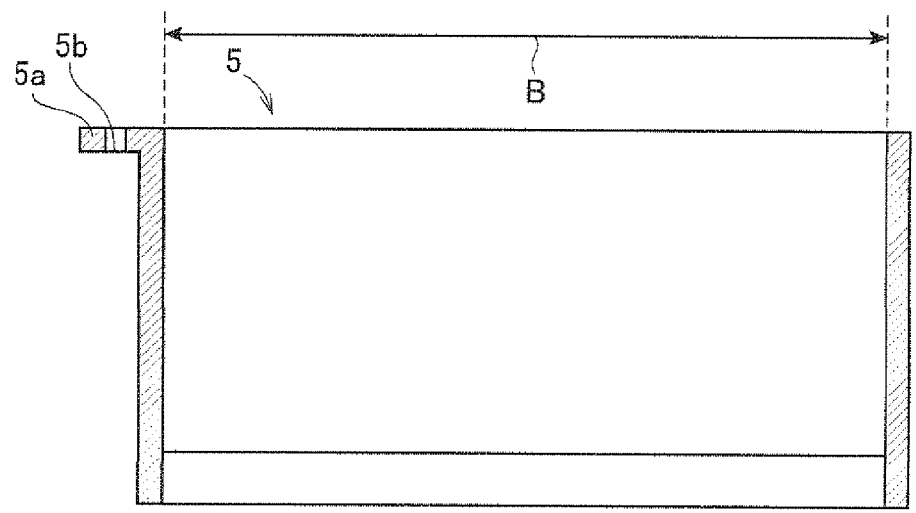
FIG. 13 is a sectional side view of the outer casing of the stator of the first embodiment at a center axis thereof.

FIG. 11 is a perspective view of an assembly body 50 including the stator coil 4 (roll body 48) and the stator core 30 assembled to the stator coil 4. FIG. 12 is a perspective view of the outer casing 5 to be shrink-fitted into the outer circumference of the assembly body 50. FIG. 13 is a sectional side view of the outer casing 5 at the center axis thereof.

As shown in FIG. 11, the back core portions 321 of the split cores 32 laminated in the axial direction are seen on the side of the outer periphery of the assembly body 50. The outer casing 5, which has a cylindrical section 5c of a thickness of 2 mm, is made of material through which magnetic flux can pass, such as low carbon steel.

In the first embodiment, the outer casing 5 is provided with an outer brim 5a at its outer periphery at one axial end thereof (the upper end in FIGS. 12 and 13). The brim 5a projects in the direction receding from the center axis of the outer casing 5. The brim 5a is provided as three brim portions separated from one another along the circumferential direction of the outer casing 5. The number of the brim portions is not limited to three, but it may be any number larger than or equal to two.

Each of the brim portions of the brim 5a is formed with a through hole 5b used for fixing the stator 3 to the housing 10. Alternatively, only some of the brim portions may be formed with the through hole 5b.

The cross-sectional inner periphery of the cylindrical section 5c of the outer casing 5 is substantially a perfect circle.

In this embodiment, when the outer diameter of the assembly body 50 is A, the inner diameter of the outer casing 5 at normal temperature is B, and the inner diameter of the outer casing 5 when heated for shrink-fitting is C, the components of the stator 3 are manufactured to satisfy the relationship of C>A>B. Here, the value of (A−B) is called as "clamping margin".

According to this embodiment, the foregoing prior art problem in the reduction of the roundness of the inner periphery of the stator core can be eliminated. Further, since the brim 5a is formed as the small separate brim portions, it is possible to make the stator light in weight.

Further, providing the brim 5a at one axial end of the outer casing 5 so as to project in the direction receding from the center axis of the outer casing 5 makes it possible to increase the rigidity of the outer casing 5 without disturbing the insertion of the assembly body 50 into the outer casing 5.

Next, explanation is given to a method of manufacturing the stator 3 having the structure in which the assembly body 50 constituted of the stator coil 4 (roll body 48) and the stator core 30 assembled to stator coil 4 is shrink-fitted into the outer casing 5. In the following, the term "radial direction" means the radial direction of the roll body 48 or a not-shown core member, and the term "circumferential direction" means the circumferential direction of the roll body 48 or the core member.

Shaping Step:

First, twelve shaped bodies are formed from twelve electric wires. Each of the shaped bodies includes a plurality of straight portions 431 extending in parallel and arranged along the longitudinal direction of the shaped body, and a plurality of turn portions 44 each connecting the adjacent straight portions 431 on the side of one end and on the side of the other end of the straight portions alternately.

Assembling Step:

The twelve shaped bodies are assembled to one another to form the assembled wire body 47. The assembled wire body 47 includes six wire assemblies arranged side by side along the longitudinal direction of the assembled wire body 47.

Each of the wire assemblies includes a first wire section as the first winding 40a and a second wire section as the second winding 40b. Each of the first and second wire sections is constituted of one of the shaped bodies.

In each of the wire assemblies, the first and second wire sections are joined to each other by welding at their one ends to form their junction portion 45. The first and second wire sections are joined to each other for all the wire assemblies after the twelve shaped bodies are assembled to one another. Alternatively, the six wire assemblies may be assembled to one another after they are formed by joining the first wire sections to the second wire sections.

Each of the wire assemblies of the assembled wire body 47 includes a plurality of straight overlap portions 471 arranged along the longitudinal direction of the assembled wire body 47, each of the straight overlap portions 471 being constituted of the straight portion 431 of the first wire section and the straight portion 431 of the second wire section overlapped with each other. However, each of the six straight portions 431 of the turn-round portions 46 which are firstly rolled at the below described rolling step, and each of the six straight portions 431 which are lastly rolled at the below described rolling step are not overlapped with other straight portions 431.

Rolling Step:

The assembled wire body 47 is rolled around the core member by several turns (three or four turns, for example) to form the roll body 48 shown in FIG. 9. The rolling is performed while plastic-deforming the turn portions 44 of the assembled wire body 47 to within a predetermined rolling radius.

In this step, the turn portions 44 may be bent by use of a shaping die or a shaping roller. The details of the rolling step are explained in detail later.

The roll body 48 includes a plurality of straight laminate portions 481 arranged along the circumferential direction of the roll body 48, each of the straight laminate portions 481 being formed from the straight overlap portions 471 of one wire assembly laminated in the radial direction by the number equal to the number of turns of the rolling. In each of the straight laminate portions 481, the straight portions 431 as many as twice the number of turns of the rolling are overlapped and aligned in the radial direction. Also, the straight laminate portions 481 are disposed at small intervals along the circumferential direction of the roll body 48.

Assembly Step:

Between each adjacent two of the straight laminate portions 481 of the thus obtained roll body 48, the tooth portion 320 of the split core 32 is inserted from radially outside, and thereafter the split cores 32 are joined in a ring to obtain the assembly body 50 (see FIG. 11).

Shrink-Fitting Process:

In this process, the assembly body 50 (see FIG. 11) is inserted and fitted into the outer casing 5 (see FIGS. 12 and 13). First, the outer casing 5 is heated to a predetermined temperature (300° C., for example) by a not-shown heater.

Subsequently, the assembly body 50 is inserted into the heated outer casing 5. At this time, the assembly body 50 is inserted from the other axial end of the outer casing 5 (from the upper end in FIGS. 12 and 13). Alternatively, the outer casing 5 may be inserted into the assembly body 50 from the other axial end of the outer casing 5 (from the upper end in FIGS. 12 and 13) in the axial direction of the assembly body 50. In short, the insertion can be performed by relative movement between the outer casing 5 and the assembly body 50.

After completion of the insertion of the assembly body 50 into the outer casing 5, the outer casing 5 is cooled by cooling means such as a fan (not shown) for about 30 minuets to complete the shrink-fitting process.

Second Embodiment

Figure 14:
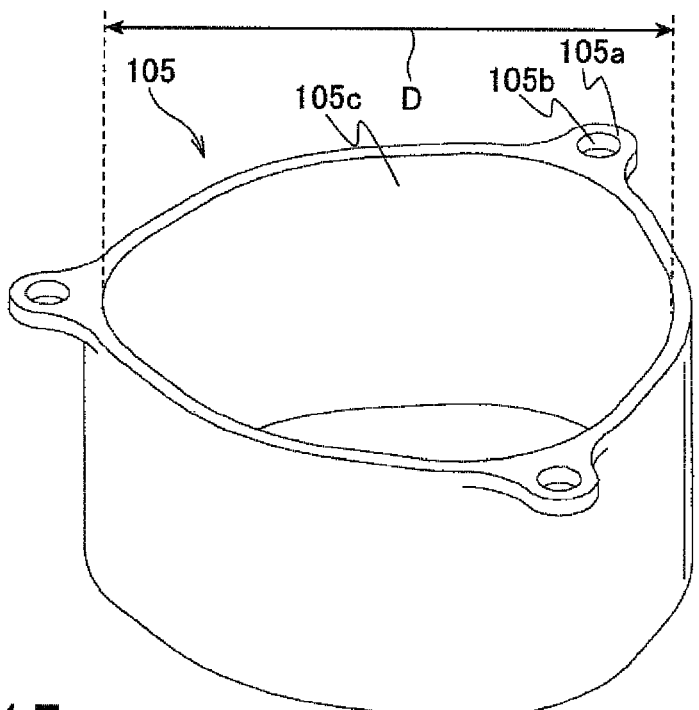
FIG. 14 is a perspective view of an outer casing of a stator according to a second embodiment of the invention.
Figure 15:
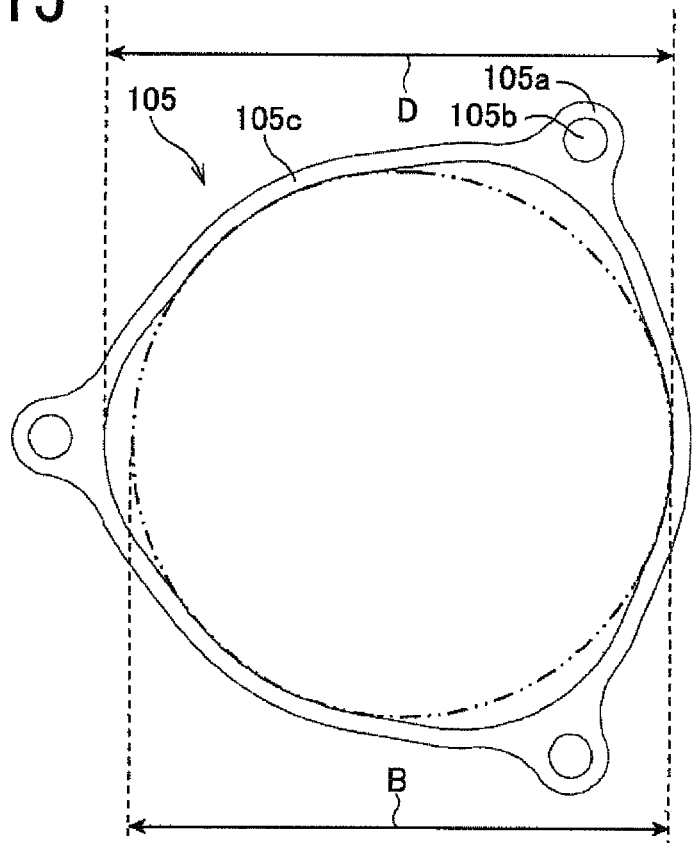
FIG. 15 is a sectional side view of the outer casing of the stator of the second embodiment at the center axis thereof.

Next, a second embodiment of the invention is described. FIG. 14 is a perspective view of an outer casing 105 to be shrink-fitted into the outer periphery of the assembly body 50. FIG. 15 is a sectional side view of the outer casing 105 at the center axis thereof.

The second embodiment differs from the first embodiment in that the outer casing 5 is replaced by the outer casing 105. A brim 105a in this embodiment corresponds to the brim 5a in the first embodiment, a through hole 105b in this embodiment corresponds to the through hole 5b in the first embodiment, and a cylindrical section 105c in this embodiment corresponds to the cylindrical section 5c in the first embodiment.

In the foregoing first embodiment, the cross-sectional inner periphery of the cylindrical section 5c of the outer casing 5 is substantially a perfect circle. However, in this embodiment, the cross-sectional inner periphery of the outer casing 105 is not a perfect circle, because the outer casing 105 expands outward at the portions in which the brim portions are provided. In the second embodiment, the clamping margin between the outer casing 105 and the assembly body 50 is smaller at the portions which are provided with the brim portions and accordingly have higher rigidity than the portions which are not provided with the brim portions and accordingly have lower rigidity. This makes it possible to reduce deformation of the stator core when the outer casing 105 and the assembly body 50 are fitted to each other.

In FIG. 15, the phantom line shows the perfect circle inscribing the inner periphery of the cylindrical section 105c of the outer casing 105. In FIG. 15, B denotes the diameter of this perfect circle, and D denotes the sum of the diameter B of the perfect circle and the amount of the expansion of the outer casing 105 toward outside at the portions in which the brim portions are provided. In this embodiment, the diameter B of the perfect circle shown by the phantom line is made equal to the inner diameter of the outer casing 105. The clamping margin at the portions in which the brim portions of the brim 105a are provided is larger by (D−B) than that other portions in which the brim portions of the brim 105a are not provided.

According to this embodiment, the foregoing prior art problem in the reduction of the roundness of the inner periphery of the stator core can be eliminated. Further, providing the brim 105a at one of the axial ends of the outer casing 105 so as to project in the direction receding from the center axis of the outer casing 105 makes it possible to increase the rigidity of the outer casing 105 without disturbing the insertion of the assembly body 50 into the outer casing 105.

Third Embodiment

Figure 16:
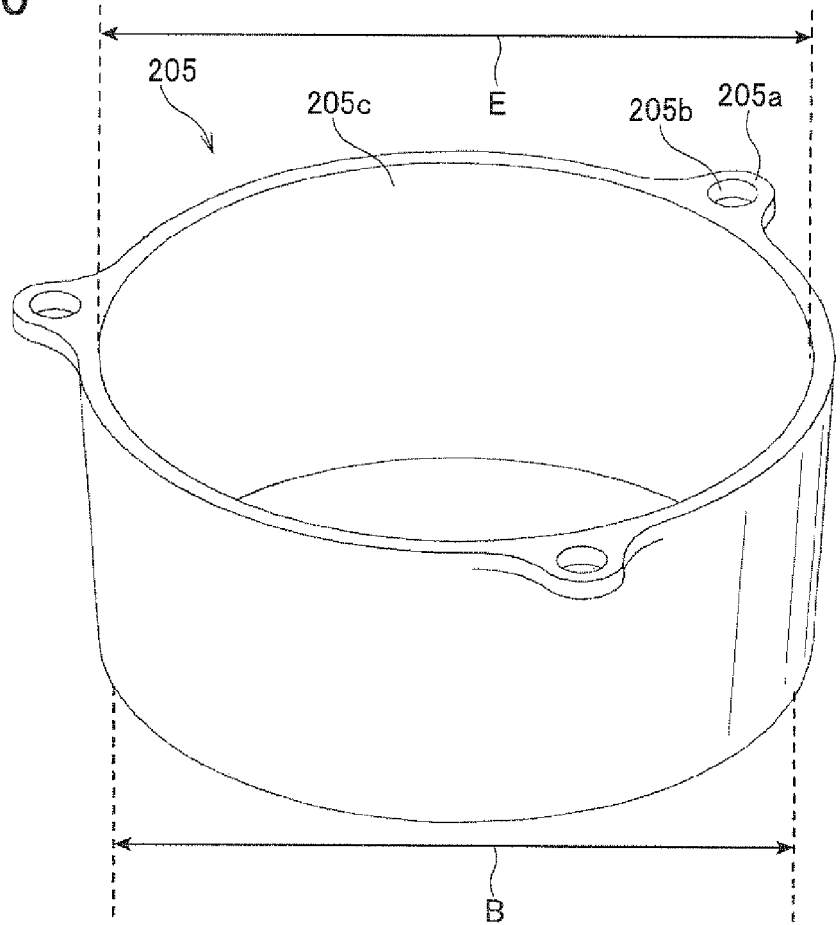
FIG. 16 is a perspective view of an outer casing of a stator according to a third embodiment of the invention.
Figure 17:
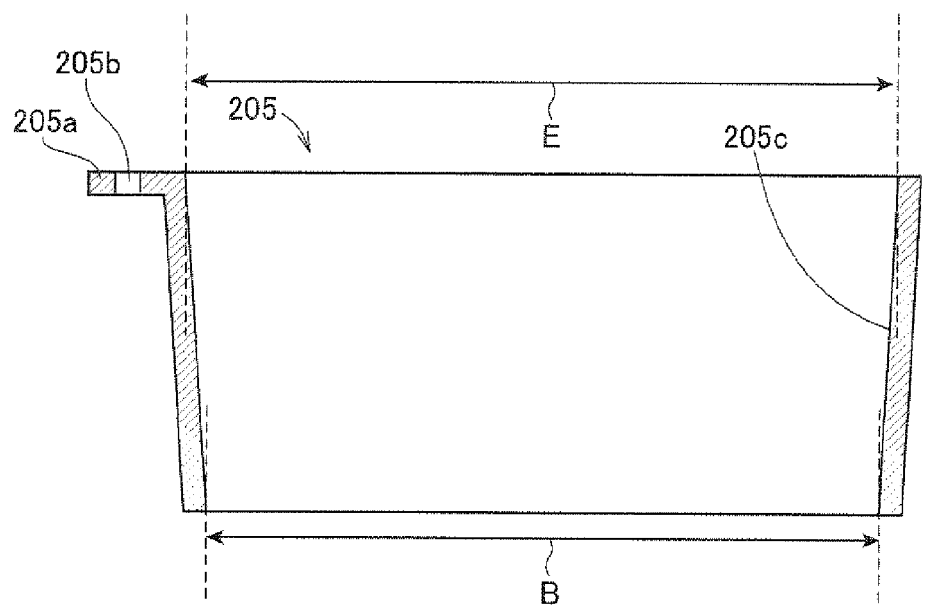
FIG. 17 is a sectional side view of the outer casing of the stator of the third embodiment at the center axis thereof.

Next, a third embodiment of the invention is described. FIG. 16 is a perspective view of an outer casing 205 to be shrink-fitted into the outer periphery of the assembly body 50. FIG. 17 is a sectional side view of the outer casing 205 at the center axis thereof.

The third embodiment differs from the first embodiment in that the outer casing 5 is replaced by the outer casing 205. A brim 205a in this embodiment corresponds to the brim 5a in the first embodiment, a through hole 205b in this embodiment corresponds to the through hole 5b in the first embodiment, and a cylindrical section 205c in this embodiment corresponds to the cylindrical section 5c in the first embodiment.

In the foregoing third embodiment, the inner diameter of the cylindrical section 5c of the outer casing 5 is constant in the axial direction. On the other hand, in this embodiment, the cylindrical section 205c of the outer casing 205 has a tapered shape so that the inner diameter of the cylindrical section 205c gradually decreases in the direction from one axial end thereof (the upper end in FIGS. 16 and 17) to the other axial end thereof (the lower end in FIGS. 16 and 17). That is, in this embodiment, the clamping margin between the outer casing 205 and the assembly body 50 is not uniform in the axial direction of the outer casing 205, but gradually increases from the one end toward the other end.

As shown in FIG. 17, the inner diameter of the cylindrical section 205c is E at the axially upper end, and B (B<E) at the axially lower end. The inner diameter B at the axially lower end is made equal to the inner diameter of the outer casing 205 of the third embodiment. The clamping margin at the axially upper end is smaller than that at the axially lower end by the value of (E−B).

According to the third embodiment, the foregoing prior art problem in the reduction of the roundness of the inner periphery of the stator core can be eliminated.

Further, providing the brim 205a at one of the axial ends of the outer casing 205 so as to project in the direction receding from the center axis of the outer casing 205 makes it possible to increase the rigidity of the outer casing 205 without disturbing the insertion of the assembly body 50 into the outer casing 205.

Further, according to this embodiment, since the clamping margin at the portions (the one axial end) which are provided with the brim portions and accordingly have higher rigidity is made different from that at the portions (the other axial end) which are not provided with the brim portions and accordingly have lower rigidity, it is possible to reduce deformation of the assembly body 50 when it is inserted into the outer casing 205 to thereby maintain the high roundness of the inner periphery of the assembly body 50.

Fourth Embodiment

Figure 18:
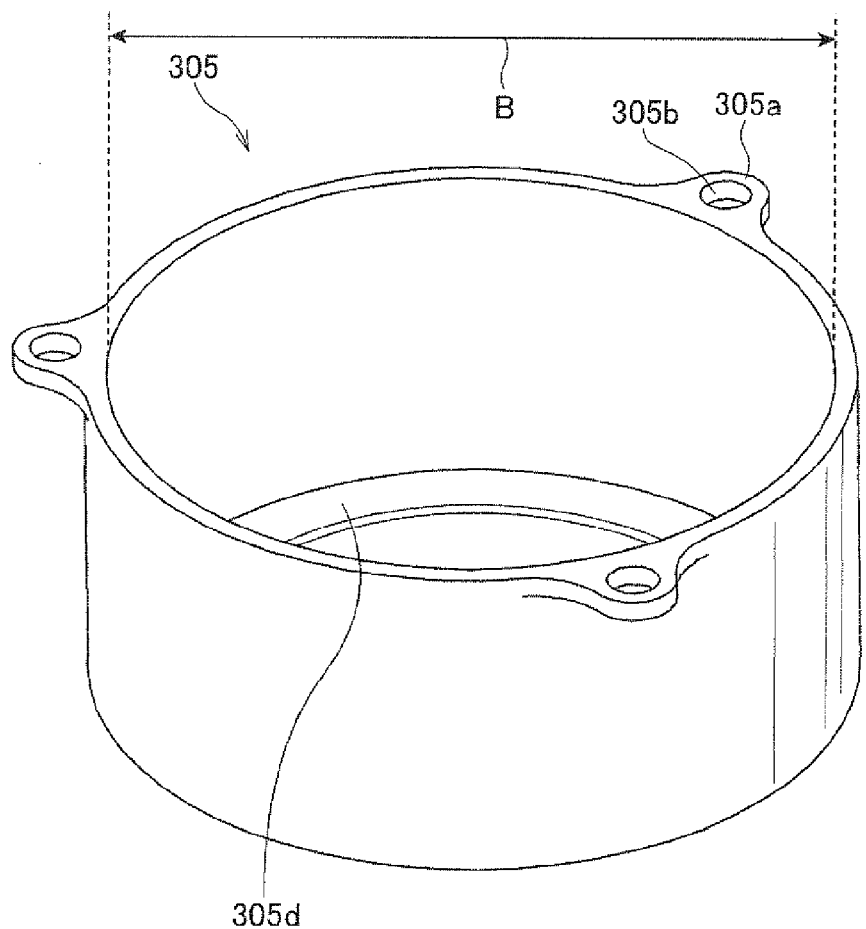
FIG. 18 is a perspective view of an outer casing of a stator according to a fourth embodiment of the invention.
Figure 19:
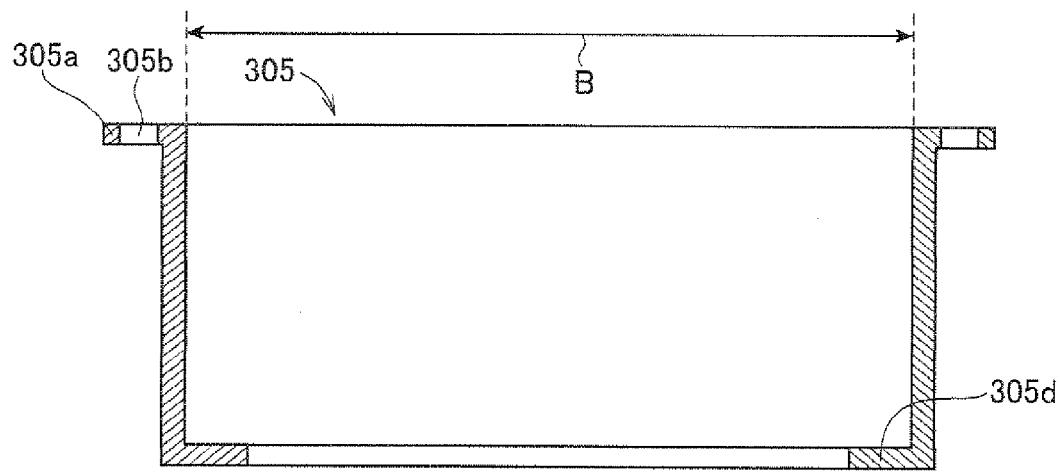
FIG. 19 is a plan view of the outer casing of the fourth embodiment.

Next, a fourth embodiment of the invention is described. FIG. 18 is a perspective view of an outer casing 305 to be shrink-fitted into the outer periphery of the assembly body 50. FIG. 19 is a plan view of the outer casing 305.

The fourth embodiment differs from the first embodiment in that the outer casing 5 is replaced by the outer casing 305. An outer brim 305a in this embodiment corresponds to the brim 5a in the first embodiment, a through hole 305b in this embodiment corresponds to the through hole 5b in the first embodiment, and a cylindrical section 305c in this embodiment corresponds to the cylindrical section 5c in the first embodiment.

The outer casing 305 is also provided with an inner brim 305d at its inner periphery at one axial end thereof (the lower end in FIGS. 18 and 19). The inner brim 305d is provided so as to project toward the center axis of the outer casing 305. Accordingly, when the assembly body 50 being inserted into the outer casing 305 abuts against the inner brim 305d, the assembly body 50 is stopped.

Providing the outer casing 305 with the inner brim 305d at one of axial ends thereof increases the circumferential rigidity of the outer casing 305, so that the assembly body 50 can be fitted into the outer casing 305 firmly independently of the fitting procedure, and the roundness of the inner periphery of the assembly body 50 can be made high. Since the inner brim 305d projecting from one of the axial ends of the outer casing 305 to the center axis of the outer casing 305 serves as a stopper, it is possible to prevent the assembly body 50 from protruding from the one of the axial ends of the casing 305. Further, the inner brim 305d can be used as a positioning member for the assembly body 50.

The foregoing first to third embodiment can attain the above advantages by providing their outer casings with the inner brim 305d in addition to their respective advantages.

OTHER EMBODIMENTS

In each of the first to fourth embodiments, the outer casing is provided with the outer brim at one axial end thereof. However, the outer casing may be provided with the outer brim at both ends thereof, or its intermediate portion between the upper and lower ends thereof. Also in this case, the same advantages as those obtained in the case where the outer casing is provided with the outer brim at one axial end thereof can be attained.

Although the fitting between the outer periphery of the assembly body and the inner periphery of the outer casing is performed by shrink-fitting in the above embodiments, it may be performed by press-fitting to obtain necessary fitting strength.

The present invention can be applied to an electric rotating machine mounted on an electric vehicle or a hybrid vehicle so that the cross-sectional inner periphery of the stator core of the electric rotating machine is substantially a perfect circle to thereby make the electric rotating machine compact in size and to increase the output of the electric rotating machine.

The above explained preferred embodiments are exemplary of the invention of the present application which is described solely by the claims appended below. It should be understood that modifications of the preferred embodiments may be made as would occur to one of skill in the art.

What is claimed is:

1. A stator of an electric rotating machine comprising:
   a stator core constituted of a plurality of split cores joined to one another in a ring;
   a plurality of phase windings wound around the stator core; and
   an outer casing to an inner periphery of which an outer periphery of the stator core is fitted with clamping margin therebetween;
   wherein the outer casing is provided with a brim including at least two brim portions at least at one of axial ends thereof,
   the brim portions being spaced from each other in a circumferential direction of the outer casing and projecting in a direction radially outwardly from a center axis of the outer casing, wherein
   the clamping margin is not uniform along the circumferential direction of the outer casing, a value of the clamping margin at portions of the outer casing in each of which the brim portion is provided is smaller than at other portions of the outer casing in each of which the brim portion is not provided, and
   the inner periphery of the outer casing is expanded radially outwardly at the brim portions, whereby an inner diameter of the outer casing is greater at portions of the outer casing in each of which the brim portion is provided than at other portions of the outer casing in each of which the brim portion is not provided.

2. The stator according to a claim 1, wherein the outer casing is provided with the brim at one of the axial ends thereof, the clamping margin is not uniform along an axial direction of the outer casing, a value of the clamping margin at the one of the axial ends of the outer casing is smaller than at the other of the axial ends of the outer casing.

3. The stator according to a claim 2, wherein the value of the clamping margin gradually increases from the one of the axial ends to the other of the axial ends in the axial direction of the outer casing.

4. The stator according to claim 1, wherein the outer casing is shrink-fitted into the stator core.

* * * * *